United States Patent Office 2,985,909
Patented May 30, 1961

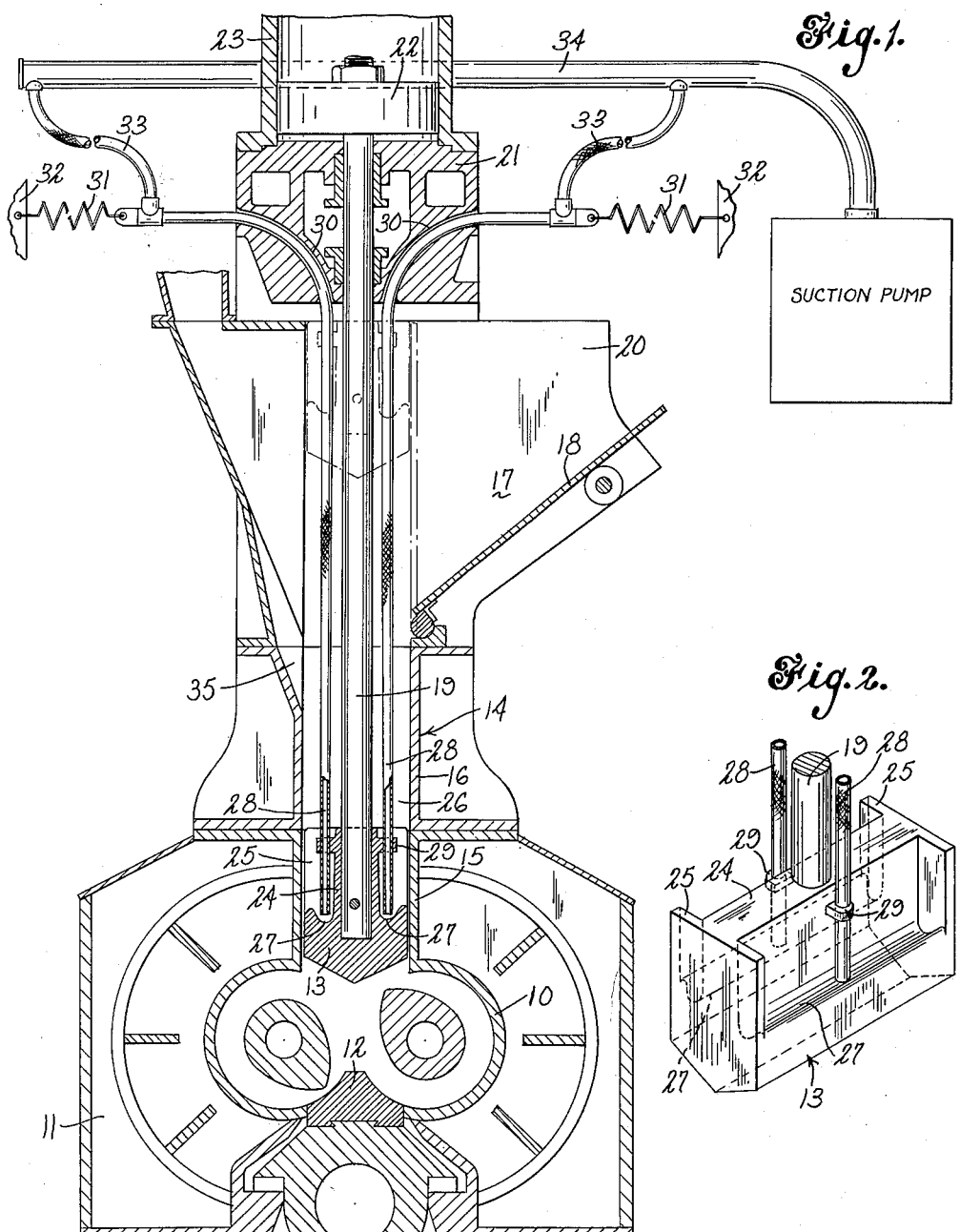

2,985,909
APPARATUS FOR DEMOISTURIZING PLASTIC MATERIALS

George W. Smith and Richard N. Comes, Woodbridge, and John M. Joyner, Winsted, Conn., assignors to Farrel-Birmingham Company, Incorporated, Ansonia, Conn., a corporation of Connecticut Filed Mar. 20, 1958, Ser. No. 722,741
4 Claims. (Cl. 18—2)

This invention relates to an apparatus for demoisturizing plastic materials, and it has particular reference to the removal of water or other moisture from a mass of rubber or plastic undergoing treatment in a mixer or masticator, for example, a Banbury mixer.

The material being treated may be rubber such as GR-S or Butyl rubber, which material is to be dewatered, for example, or the material may be a cellulosic or other plastic containing water or other vaporizable or volatile ingredient which it is desirable to remove in whole or in part.

In the case of rubber, for example, the mass to be treated may contain water or other volatiles in amounts which vary through wide limits. For example, a batch of rubber to be processed may contain water weighing considerably more than the rubber, but if some initial drying has been done another batch may contain much greater weight of rubber than water.

One object is greatly to increase the efficacy and speed of removal of moisture from masses of plastic material undergoing massing or mixing in a Banbury or like mixer.

A further object is to provide a novel apparatus by which moisture is effectively removed partly by mechanical action and partly by heating to which the mass is subjected.

To these and other ends the invention consists in the novel features and elements hereinafter described and claimed.

In the accompanying drawing:

Fig. 1 is a somewhat diagrammatic vertical section of a mixer apparatus for treating a mass of moisture-containing material; and Fig. 2 is a perspective view of the pressure ram.

In the apparatus shown in the drawing, a Banbury mixer has an outer casing through which water or other fluid may be circulated for raising the temperature of the mass being treated. The mixing chamber has the usual rotors under which is located a discharge door, and above the rotors a pressure ram or floating weight is used for imposing pressure on the material being treated, this ram being mounted in a stack or guideway and being connected with a piston operating in an upper cylinder used for raising and lowering the ram by power. Above the mixer casing a loading opening for the material to be treated is provided at one side of the hydraulic pressure device. The ram has associated with it means for gathering free moisture, which moisture may be removed by suction pipes or tubes arranged as hereinafter described and subject to suction for disposal of the moisture.

In the drawing, the wall defining the mixing chamber is indicated at 10, the heating jacket surrounding this wall at 11, and the lower discharge door of the mixing chamber at 12, the latter being in this case a horizontally slidable door. The pressure ram is shown at 13, this being of oblong shape. The pressure ram is slidable vertically in a stack or chute member generally indicated at 14. There are small clearance spaces between the two sides and the ends of the ram on the one hand and the member 14 on the other hand, permitting water or other liquid to move upwardly toward the upper part of the ram. The guide or chute 14 comprises a lower section 15 provided as a part of the jacketed mixing chamber, and resting on this section 15 is a section 16 forming a continuation of this member. Immediately above section 16 and at the right-hand side (Fig. 1) is a loading opening 17 through which the material to be treated can be fed downwardly into the chute, this opening 17 having associated therewith a member 18 which in this particular case can serve both as an inclined slideway and as a closure member for the upper part of the chute.

The ram 13 is connected to an upwardly extending piston rod 19. This piston rod, as shown in Fig. 1, extends upwardly beyond the upper end of the chute member 20 in which the loading opening is provided, and the upper end of the piston rod slides up and down in a guide member 21, the upper extremity of the piston rod being secured to a piston 22 within a cylinder 23 supported on member 21. By this arrangement, pressure fluid introduced into the cylinder 23 and controlled in a known manner can be employed for moving the ram upwardly or downwardly, as desired, downward pressure of the ram being effective to impose pressure on the mass in the mixing chamber and upward movement being effective to reduce the pressure.

Referring now to the particular form of ram or weight 13 shown by way of example, this ram has planar downwardly converging lower surfaces symmetrically located between the rotors of the mixer, and above the lower extremity of the ram the latter is cut away at the sides to present a partition-like member 24 extending generally lengthwise of the mixing chamber. At the ends of this partition member are end walls 25 for the ram located in proximity to opposite end walls, such as 26, of the chute 14. At opposite sides of the partition member 24 the ram is cut away to create adjacent the lower part of this partition member longitudinal grooves 27 to provide collection wells adapted to receive and hold free moisture (liquid) moving upwardly from the mixing chamber into the chute or stack 14.

At each side of the ram and in association with each longitudinal groove 27 is a suction tube 28 vertically disposed and having a lower extremity fixedly held in a position where it is slightly above the bottom of the associated groove. A fastening member 29, such as shown in Fig. 2, may be used for holding the tube in this position. Each of these tubes is a flexible one extending upwardly at one side of the piston rod and engaging and slidable in a curved guide hole 30 in the cylinder base 21. The upper extremity of each of these tubes 28 is shown as connected by an extensible spring 31 to a fixed support 32 on the framework of the apparatus, each such spring 31 exerting upward pulling force on the corresponding tube.

Near the upper extremity of each tube 28 the tube is suitably connected as by a flexible branch tube 33 to a suction pipe 34 common to the two tubes, said suction pipe 34 being subject to the action of a suitable pump adapted to suck moisture from the grooves in the ram and to serve as a discharge or disposal member for the moisture.

In operation, the rubber or other plastic material (the term "plastic" being used in a broad sense) is loaded into the mixer by way of the loading opening 17, and after loading, with the discharge door closed, the ram is brought down upon the mass, producing a pressure upon the mass since the latter is then enclosed from all directions. As the rotors of the mixer rotate in the usual manner, moisture is squeezed out of the material and moves upwardly through clearance spaces between the opposing surfaces of the ram and the chute. These clearance spaces are so small that, while moisture is permitted to pass, the other portion of the mass will be retained. The rotary action of the rotors provides a substantial agitation of the mass so that the liquid is continually presented to those areas from which it can escape from the mixing chamber instead of being trapped or locked in the mass, which would be the case if, for example, the rotors were not turning.

The liquid escaping around the ram, as above mentioned, is sucked into the tubes 28 and carried upwardly to the discharge pipe 34 in a manner which will be obvious.

It will be understood that by reason of the mounting of the tubes 28 in the manner above described, or in an equivalent manner, the tubes will retain their positions relative to the ram and its moisture-collecting grooves. When the ram is raised from the Fig. 1 position to the position shown in broken lines in Fig. 1, the upper ends of the tubes will be drawn to laterally outward positions; and upon return of the ram from the broken-line position to the full-line position, the tubes will be restored to the position first described. By the arrangement described the liquid in the mass being treated will be sucked off as rapidly as it reaches the collecting area provided on the upwardly facing part of the ram. The moisture is moved upwardly into this collecting provision or area very effectively and quickly because of the fact that the pressure created on the whole mass by the ram and the moving rotors reaches such a high degree. The whole mass is, in effect, under hydrostatic pressure so that any free moisture is taken up as it accumulates beneath the suction tubes.

For treatment of a mass of synthetic rubber, the clearance space between a face of the ram or floating weight and the opposing face of the stack may have a width of say 1/16 inch. Obviously the width may vary so as to be in conformity to the characteristics of the material and other existing conditions.

The moisture removal as described up to this point is understood to be due to mechanical phenomena. There is also to be considered the influence of heat upon the volatile matter in the mass being treated. Heat can be imparted to the mass by circulating hot water or other fluid in the heating jacket 11. If the mass being treated contains water, a temperature of 212° F. imparted to the mixing chamber will cause vaporization of the water and the elimination of the water will, therefore, be expedited. With the use of the heating jacket, the temperature of the mass will gradually increase as the operation is started owing to the contact of the mass with the heated chamber and to internal friction set up within the mass. As massing continues further and as the temperature of the mass increases, any liquid remaining in the chamber will vaporize or volatilize, and will escape through the upper portion of the chute or guide. Gases or steam vapors will be produced by the heat and these can be very conveniently removed by raising the ram from time to time and allowing these vapors to escape through a degassing vent such as the vent 35 shown in Fig. 1 at the left-hand side of the chute, leading to a dust-collecting chamber. Such a degassing vent may, if desired, be of the structure and arrangement shown in the copending application of George W. Smith, Serial No. 722,815, filed March 20, 1958, now Patent No. 2,923,967.

As in the case of the moisture removal by mechanical action, the agitation of the mass which is proceeding is of great benefit, since the mass is being continually worked to the point where vapors which are generated at one moment within the mass are shortly afterwards moved and exposed to a portion of the mixing means where they can be readily vented or withdrawn to the outside atmosphere. By the procedure described, there is very effective inhibition of trapping of the moisture within large particles preventing rupture of the particles sufficiently to expose the liquid for escape.

In the case of removing water from rubber, for example, the heat required to vaporize the water is 212° F. It is found, however, that it is not necessary in all cases to reach this temperature in view of the fact that, if the chamber is subject to a vacuum, the temperature can be lowered. If this is desirable, a vacuum may be introduced into the mixing chamber and in this manner the time required to vaporize remaining liquid and the cost of doing so will be less than when vaporization at atmospheric pressure is necessary.

Various modifications and changes in the detailed procedure and in the apparatus may be made without departing from the principles of the invention and the scope of the claims.

What we claim is:

1. In a mixer for massing and demoisturizing plastic material, the combination of means providing a mixing chamber having laterally located rotors and beneath the rotors a discharge opening and above the rotors an upwardly leading stack, a floating pressure element in the stack having lateral clearance in the stack preventing escape of a material being massed or mixed but permitting movement of contained moisture upwardly at one or more sides of the pressure element, said element being provided with a moisture-collecting well at its upper face and suction means for removing and disposing of liquid moving upwardly through the clearance space into said well.

2. The combination of claim 1, in which the means for removing and disposing of the upwardly driven liquid includes disposal suction means for picking up liquid from said collection area and flexible conduits connected to the suction means and secured to the pressure element to be movable with the latter and extending into said well.

3. The combination of claim 1, in which said floating pressure element has at each side a longitudinal collecting groove providing the collecting well and flexible conduits secured at one end to the suction means and extending into said grooves, said conduits being fixed to the pressure element to be movable therewith, and spring means connected to the conduits exerting an upward force thereon.

4. A demoisturizing mixer as in claim 1 wherein the stack is provided with a relief passage in its side wall uncovered by the pressure element when the latter is raised from its working position.

References Cited in the file of this patent

UNITED STATES PATENTS

| | | |
|---|---|---|
| 2,351,706 | Robinson | June 20, 1944 |
| 2,680,264 | MacLeod | June 8, 1954 |
| 2,711,686 | Denison et al. | June 28, 1955 |
| 2,714,349 | Johnston | Aug. 2, 1955 |